Dec. 3, 1935.  J. W. SMITH  2,023,105
AUTOCOPTER AIRCRAFT
Filed July 19, 1932   4 Sheets-Sheet 3
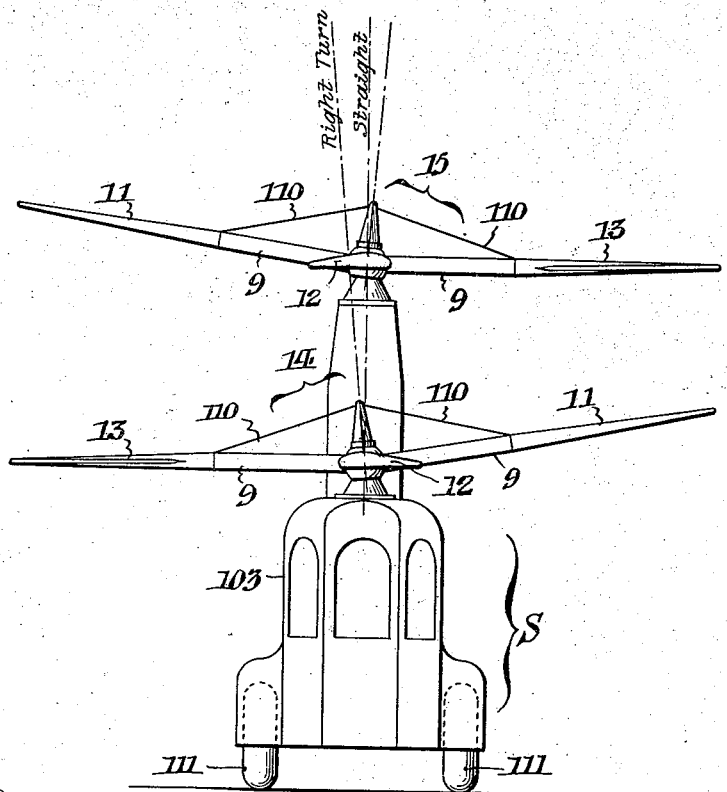
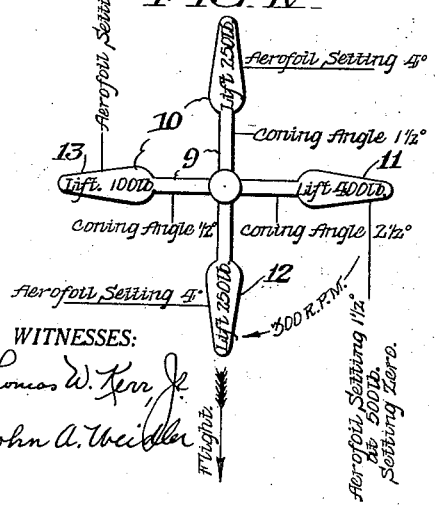
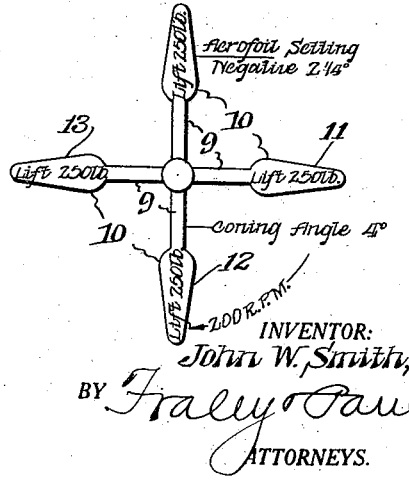

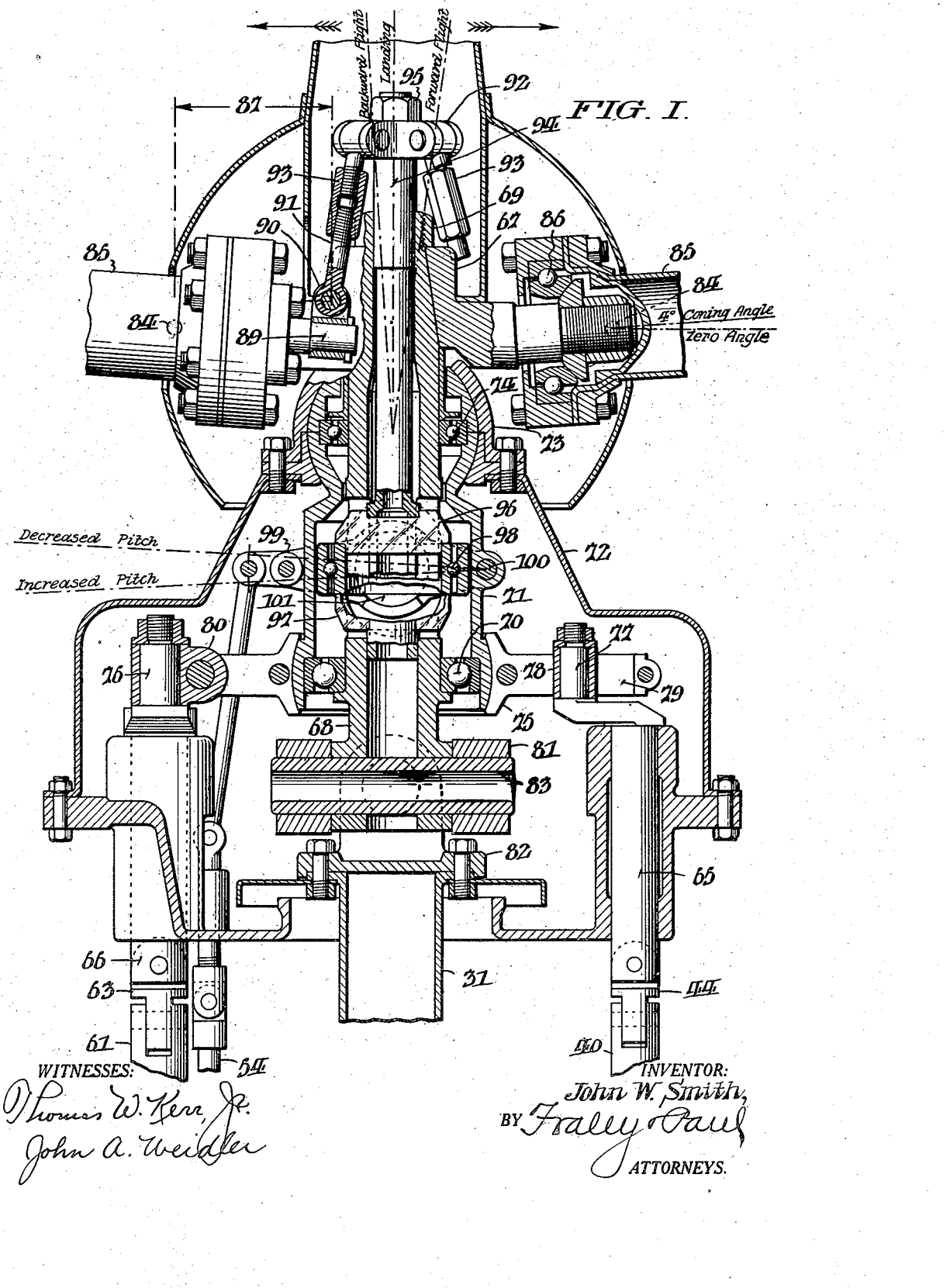

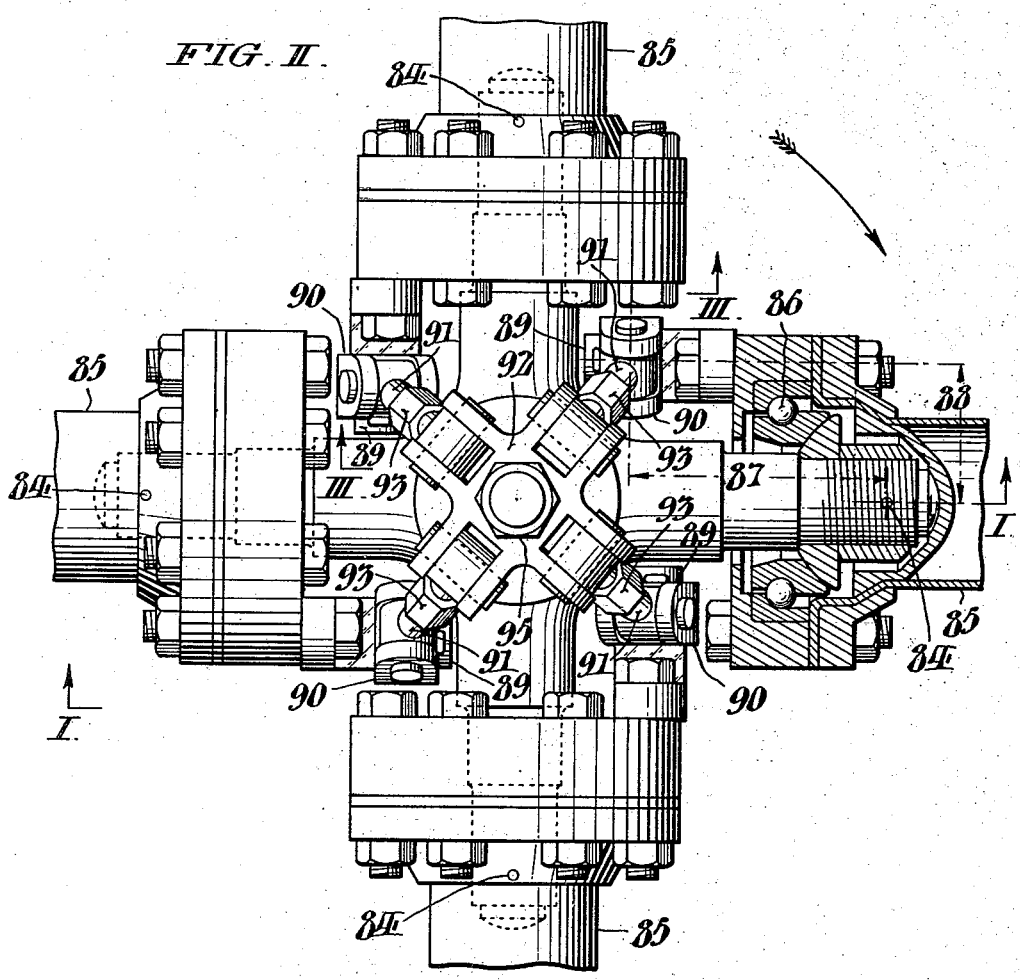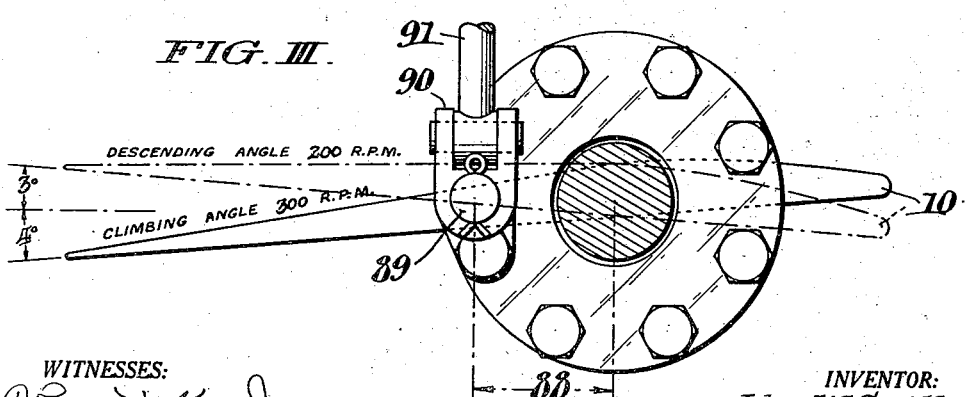

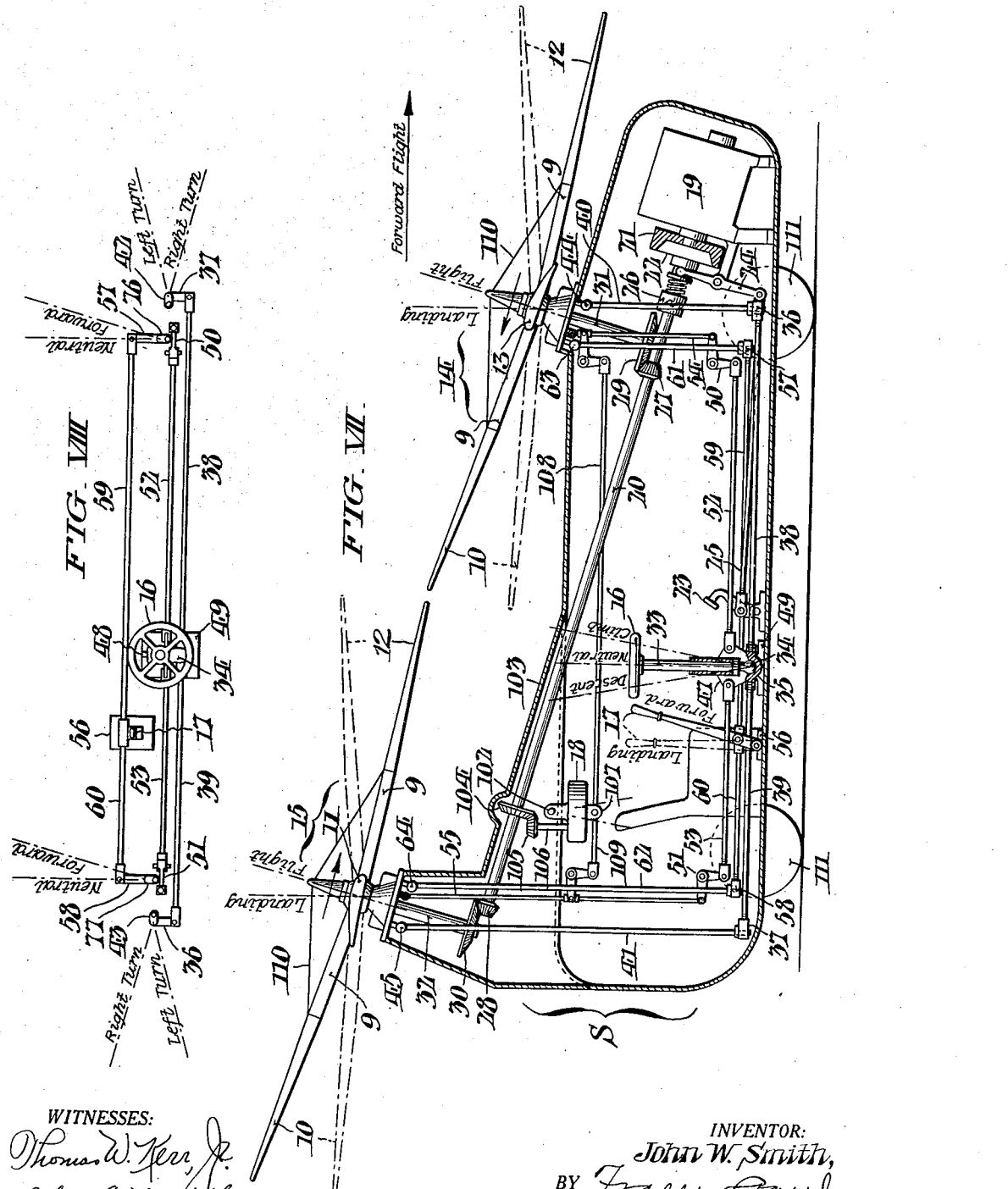

Patented Dec. 3, 1935

2,023,105

UNITED STATES PATENT OFFICE 2,023,105

AUTOCOPTER AIRCRAFT

John W. Smith, Overbrook Manor, Pa.

Application July 19, 1932, Serial No. 623,375

8 Claims. (Cl. 244—19)

My invention has reference to novel aircraft, of the heavier than air type, which I preferably term an autocopter in contradistinction with the forms now generally known as autogiros, and in which the blades or airfoils are constantly rotating while the craft is off the ground.

More specifically, this invention relates to motor driven airfoils or aerofoils for airships, and self-rotating aerofoils; and to an automatic control for all conditions of flight and landing in a small space and on rough ground, or maneuvering on the water.

My invention also aims to provide a means whereby complete control of the airship for vertical and horizontal flight is vested in manipulation of the rotating aerofoils. Important in this connection is an automatic means for shifting the aerofoil angle of incidence required to cause the rotor to function as a power driven aerofoil or a self-rotating aerofoil, or vice versa.

This automatic control for the aerofoil angle of incidence is very important in eliminating a prevalent source of danger in flight. If the motor or transmission fail to keep the rotor up to a predetermined speed, the aerofoil will automatically become self-rotating.

Centrifugal force is used to control the aerofoil angle of incidence. The rotating mass of the aerofoil is utilized in this particular case, by a means for mounting the aerofoil stem to function as a free pendulum but fulcrum to include a rotary motion of the aerofoil stem during the period of swing.

When the autocopter is in horizontal flight it is desirable to even up the lifting force of each rotor throughout the complete circumferential path.

To the attainment of the foregoing and other objects, this invention consists in the peculiar construction, certain novel features and combinations of parts, with various adaptations thereof, as hereinafter described and specifically pointed out in the claims at the end of this specification.

In the drawings:

Fig. I is a vertical section of a typical rotor construction for an autocopter, embodying my improved means for automatically controlling the aerofoil pitch, and taken as indicated by the arrows I—I in Fig. II.

Fig. II is a top plan view with the spherical housing or mast-head removed.

Fig. III is a sectional detail, taken as indicated by the arrows III—III on Fig. II.

Fig. IV is a typical example of a power driven rotor adapted to this invention.

Fig. V is a similar view of the rotor of Fig. IV converted by my novel pitch control into a self-propelled rotor.

Fig. VI is a front end elevation of my novel gyro-ship.

Fig. VII is a longitudinal sectional view showing the various controls for operating the autocopter; and, Fig. VIII is a diagrammatic plan of the controls of Fig. VII.

Referring more particularly to the several illustrations, Fig. IV illustrates a typical example of a rotor, comprehensively designated 9, twenty-eight feet in diameter including aerofoils 10, 11, 12, and 13, driven at 300 R. P. M., and having a periphery speed at the full diameter of 26,388 feet per minute.

At the center of gravity the centrifugal force for a 30 lb. revolving element is figured at 8,262 lbs. With a 250 lb. aerofoil loading the coning angle for the revolving element would be about 1° 44′, and to simplify the illustration, the coning angle for the trailing aerofoil 10 is placed at 1½°; while the forward aerofoil 12 would operate under a similar condition.

Assuming the forward speed of the autocopter S to be 12,000 ft. per minute, the advancing aerofoil 11 would have a theoretical lift of 620 lbs., while retreating aerofoil 13 would have a theoretical lift of only 40 lbs.

My automatically controlled pitch angle increases the lift on the retreating aerofoil 13, from 40 lbs. to 100 lbs. and diminishes the advancing aerofoil 11 lift, from 620 to 400 lbs.

The efficiency of the rotor 9 is greatly improved by reducing the pitch on the advancing aerofoil 11 and increasing the pitch on the retreating aerofoil 13. The disturbance due to gyroscopic force is limited to a change of coning angle of only 2°.

An autocopter S designed for vertical ascent and descent would be exceedingly dangerous if the rotor 9 should stop revolving in the event of motor failure. My automatic pitch control converts the power driven rotor 9 of Fig. IV to a self-propelled rotor, as shown in Fig. V. The aerofoil setting in Fig. V is 2¼° negative at 200 R. P. M. thus making the aerofoil self-rotating at 200 R. P. M. If the R. P. M. dropped to 175 R. P. M. the negative angle would be 3° and the aerofoil loading of 250 lbs. would be uniform around the periphery for vertical descent. For power driven ascent the aerofoil loading would be still uniform but slightly higher depending on the rate of climb.

From Fig. VII it will be seen that the forward rotor 14 rotates in the opposite direction to the rear rotor 15, thus balancing the autocopter S by arranging two rotors in tandem rotating in opposite directions. The rear rotor 15 is arranged in a plane above the forward rotor 14 to avoid the slip stream of said forward rotor.

The lateral stability of the autocopter S is automatically insured due to the arrangement of the rotors 14, 15, while automatic pitch control turning to right or left is under control of the steering wheel 16. The movements of the steering wheel 16 are similar to that used in an automobile, or said steering wheel 16 is turned to the right for a "right-hand" turn, and leftwardly for a "left-hand" turn. Fore and aft balance of the ship S is effected by pushing the hand wheel 16 forward or pulling it backward.

A hand lever 17 is used to tilt the axes of the rotors 14, 15, vertical, for vertical ascent and descent; whereas, the forward and backward movement of the hand wheel 16 would accomplish the same results by tipping the keel of the ship S fore or aft.

During flight, the fore and aft movement of the hand wheel 16 would be the only critical control to be supervised by the pilot. This critical control could be made automatic by employing a suitable gyroscope 18, or by a gyroscopic-connection from either of the rotors 14, 15, not shown. In the event of automatic control of the fore and aft stability, hand lever 17 would be the sole means of forward motion and there would not be any critical control for the pilot to supervise.

The technique required to drive my autocopter S need not be materially different from that required to drive the present day automobile.

A suitable source of power 19 drives the pinion shaft 20, mounted in suitable bearings, through the medium of a driving clutch member 21 and driven clutch member 22, under control of a foot pedal 23 and pivoted lever 24 connected by a link 25. The operator may disengage clutch member 22 at any time by pressing on the foot pedal 23; while a free wheeling clutch 26 allows the rotors 14, 15 to continue to rotate.

Bevel pinions 27 and 28 are securely fastened to the pinion shaft 20 and intermesh with bevel gears 29 and 30 which are secured to drive shafts 31 and 32, which are drivably connected to rotors 14 and 15. The steering wheel 16 is secured to a crank-shaft 33 and ball crank 34 which is mounted in a spherical seat 35.

Referring to Fig. VII and Fig. VIII, the cranks 36 and 37 are actuated by rods 38 and 39 secured to ball and socket seat 35. Crank-shafts 40 and 41 transmit the rotary motion from cranks 36 and 37 to cranks 42 and 43 through universal joints 44 and 45, and it is to be noted that the cranks 42 and 43 Fig. VIII, have associated indications showing that the crank movements are in opposite directions.

The steering wheel shaft 33 is mounted on a rocker plate 47 having a pivot fulcrum 48 in a bracket 49 in the same plane as the ball crank 34, thus avoiding any appreciable lateral movement of rods 38 and 39 when the rocker plate 47 is moved fore or aft. This rocker plate 47 imparts motion to bell cranks 50 and 51 through links 52 and 53; while links 54 and 55 are hinged to the bell cranks 50 and 51.

Hand lever 17 is pivoted to a floor plate 56 and actuates cranks 57 and 58 through links 59 and 60; while crank shafts 61 and 62 transmit motion to a universal joint 63.

Referring to Fig. I, it will be seen there are two fundamental controls and one auxiliary control. A crank shaft 64 tilts the rotor axis laterally for turning either to the right or left hand.

A link 65 has very slight movement for adjusting the fixed position for aerofoil angle of attack but does not in any way interfere with the automatic control of aerofoil pitch. The object is to locate the fixed end of the automatic pitch control to a point that will balance the lift of the forward rotor 14. With the lift of the aft rotor 15, the auxiliary control shifts the rotor axis fore and aft by rotating a crank shaft 66. Each rotor hub 67 is secured to a rotor shaft 68 by a nut 69. A ball thrust bearing 70 is mounted on the rotor shaft 68 and is seated in a sleeve 71 which has spherical bearing in a housing 72 and cap 73; while said rotor shaft 68 is further journaled in a ball bearing 74 which is also mounted in sleeve 71.

A yoke 75 is mounted on the free end of the sleeve 71 by a spherical seat and receives a forward and aft movement from the crank pin 76. A crank pin 77 is mounted in a rectangular-bushing 78 which is free to slide backward and forward in a slot 79 in the yoke 75.

When the crank shaft 64 is rotated a lateral movement is imparted to the free end of the sleeve 71. A universal joint 80 pivots around the crank pin 76 allowing yoke 75 to be swung by rotation of the crank shaft 64. The slot 79 in yoke 75 permits of a free fore and aft movement when actuated by rotating crank shaft 66.

Rotor shaft 68 is rotated by a universal joint, in which 81 is a floating ring mounted on a pivot in a flange 82 by a pivot pin 83; said flange 82 being bolted to the main driving shaft 31, 32.

Figs. I, II and III illustrate the mechanism for automatically controlling the aerofoil pitch. 84 in Figs. I and II is the pivot around which the aerofoil stem 85 is free to swing to a point where centrifugal force and aerofoil lift are balanced. A ball bearing 86 is designed to take the thrust load due to centrifugal force and the radial load due to rotating the aerofoils 10—13 when the pitch is being adjusted.

Fig. I shows a 4° coning angle for aerofoil stem 85 taken from the zero line. The longitudinal radius 87 from pivot 84 in Figs. II and III is 2½ times the radius of 88, taken in a radial direction, therefore when the aerofoil stem 85 swings through an angle of 1° the pitch of the particular aerofoil would be altered 2½°. A working range for automatic control of aerofoil pitch is illustrated in Fig. III. The fixed position of the crank pin 89 is under control of the operator or the gyroscope 18. Mounted on the crank pin 89 is a universal joint 90 hinged to a link 91 and cross head 92, while an adjusting nut 93 is used to synchronize the aerofoil pitches for each individual rotor. Crosshead 92 is held in place on the plunger 94 by a nut 95.

Keys 96 and 97 fit in slotted openings in plunger 94 and are free to follow the reciprocating movement of said plunger in the rotor shaft 68; while a ball thrust bearing 98 is mounted between the keys 96 and 97. A lever 99 is fulcrumed on a pin 100, the trunnion 101 whereof is mounted in an annular hole in the lever 99 and is slotted to engage the outer ring of ball thrust bearing 98.

The gyroscope 18 has hinged connection 102 fixed to the fuselage 103 of the autocopter S and is driven from the pinion shaft 20 by a gear 104 and pinion 105; while 106 is a flexible drive shaft for the gyroscope 18. A hinged joint 107 is the control connection for control rods 108 and 109.

The gyroscope control and manual control make use of the same control mechanism and does not need any further description. When the gyroscopic control is installed the manual control could be supplied as an auxiliary.

The several aerofoils 10—13 are provided with flexible guys 110 under appropriate influence, not shown, to accommodate angular variation in climbing and descending.

The wheels 111 of my autocopter S serve as shock absorbers when making a vertical descent and are also suitable to accommodate taxying on the ground to and from a hangar. These wheels 111 are mounted, as shown, in stream line projections on the hull of the fuselage 103. The forward pair of wheels 111 may be lifted clear off the ground by the forward and aft control thus facilitating short turns while taxying. The hull is designed for landing on water and can be taxied and maneuvered by the rotors 14, 15 in an obvious manner while on the water.

Having thus described my invention, what I claim is:—

1. A free-wheeling motor driven autocopter rotor for airships, said rotor having mounted on the hub thereof two or more aerofoils, each aerofoil being provided with a universal fulcrum including a fixed pivot and means whereby the angle of incidence will have a predetermined positive angle of attack at a predetermined rotary speed, or a negative angle of attack for self rotating when a predetermined drop in rotary speed takes place, and said universal fulcrum adjusting the angle of incidence during each rotary cycle to compensate for variation in aerodynamic forces.

2. An airship having two or more autocopter rotors, each rotor having mounted on the hub thereof two or more aerofoils each having a universal fulcrum including a fixed pivot, and a synchronizing means attached to the fixed pivot of the universal fulcrum whereby the angle of incidence of the aerofoils may be synchronized while in flight.

3. An airship having two or more autocopter rotors, each rotor having mounted on the rotor hub thereof two or more aerofoils each having a universal fulcrum including a fixed pivot, a synchronizing means attached to the fixed pivot of the universal fulcrum whereby the angle of incidence of the aerofoils may be synchronized while in flight, and means for tilting the rotating axis of the forward rotor to the right for a right-hand turn and to the left for a left-hand turn.

4. An airship having two or more autocopter rotors, each rotor having two or more aerofoils and each having a universal fulcrum including a fixed pivot, and a gyroscopic synchronizing means operatively connected to said aerofoils whereby the angle of incidence of the aerofoils is synchronized while in flight.

5. An airship having two or more autocopter rotors, each rotor having mounted on the rotor hub thereof two or more aerofoils each having a universal fulcrum including a fixed pivot, a synchronizing means attached to the fixed pivot of the universal fulcrum whereby the angle of incidence of the aerofoils may be synchronized while in flight, means for tilting the rotating axis of the forward rotor to the right for a right-hand turn and to the left for a left-hand turn, and similar means whereby the rotating axis of the aft rotor may be correspondingly actuated.

6. An airship having two or more autocopter rotors, each rotor having mounted on the rotor hub thereof two or more aerofoils each having a universal fulcrum including a fixed pivot, a synchronizing means attached to the fixed element of the universal fulcrum whereby the angle of incidence of the aerofoils may be synchronized while in flight, and means for tilting the axis of either rotor longitudinally relative to the airship keel.

7. An airship having two or more autocopter rotors, mounted on each of the rotor hubs two or more aerofoils each having a universal fulcrum including a fixed pivot and a synchronizing means attached to the fixed pivot of the universal fulcrum whereby the angle of incidence of the aerofoils may be synchronized while in flight, and a transmission means providing rotary motion for the two rotors in opposite directions.

8. An airship having two or more autocopter rotors, mounted on each of the rotor hubs two or more aerofoils each having a universal fulcrum including a fixed pivot and a synchronizing means attached to the fixed pivot of the universal fulcrum whereby the angle of incidence of the aerofoils may be synchronized while in flight, a transmission means providing rotary motion for the two rotors in opposite directions, and a motor for delivering power to said transmission through a free wheeling clutch.

JOHN W. SMITH.